(12) United States Patent
Tanaka

(10) Patent No.: US 12,073,662 B2
(45) Date of Patent: Aug. 27, 2024

(54) ABNORMALITY DETECTION SYSTEM, ABNORMALITY DETECTION METHOD, AND ABNORMALITY DETECTION PROGRAM

(71) Applicant: NEC Corporation, Tokyo (JP)

(72) Inventor: Kenichi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 17/630,222

(22) PCT Filed: May 29, 2020

(86) PCT No.: PCT/JP2020/021375
§ 371 (c)(1),
(2) Date: Jan. 26, 2022

(87) PCT Pub. No.: WO2021/019893
PCT Pub. Date: Feb. 4, 2021

(65) Prior Publication Data
US 2022/0284742 A1 Sep. 8, 2022

(30) Foreign Application Priority Data

Jul. 31, 2019 (JP) ................................ 2019-140491

(51) Int. Cl.
*G07C 5/00* (2006.01)
*B60R 16/023* (2006.01)

(52) U.S. Cl.
CPC .......... *G07C 5/008* (2013.01); *B60R 16/0232* (2013.01)

(58) Field of Classification Search
CPC ............................. G07C 5/008; B60R 16/0232
See application file for complete search history.

(56) References Cited

U.S. PATENT DOCUMENTS

2006/0025966 A1 2/2006 Kanamaru
2007/0126559 A1* 6/2007 Adachi ................. G07C 5/008
340/506
(Continued)

FOREIGN PATENT DOCUMENTS

CN 109229034 A 1/2019
JP 2004-268633 A 9/2004
(Continued)

OTHER PUBLICATIONS

JP Office Action for JP Application No. 2021-536631, mailed on Feb. 21, 2023 with English Translation.
(Continued)

*Primary Examiner* — Anshul Sood
*Assistant Examiner* — Oliver Tan

(57) ABSTRACT

A control unit 80 which is mounted on mobility to be controlled and controls the mobility, includes a condition detection unit 81 which detects the condition of the mobility, a condition determination unit 82 which determines the condition of the mobility based on the detected condition, and a condition transmission unit 83 which transmits to the external server 90 the detected condition of the mobility and position information indicating a position where the condition is detected. An external server 90 includes an abnormal condition determination unit 91 which determines an abnormal condition of the mobility in consideration of the position information, based on the received condition of mobility and the received position information, and a determination result transmission unit 92 which transmits a determination result to the control device 80. The condition determination unit 82 in the control device 80 determines the condition of the mobility, based on the received determination result and the detected condition.

6 Claims, 4 Drawing Sheets

(56) References Cited

U.S. PATENT DOCUMENTS

| | | | |
|---|---|---|---|
| 2017/0092020 A1 | 3/2017 | Hathaway et al. | |
| 2019/0387023 A1* | 12/2019 | Yokota | H04W 4/40 |
| 2020/0053112 A1* | 2/2020 | Torisaki | H04L 67/12 |
| 2020/0226920 A1* | 7/2020 | Takenaka | G08G 1/096775 |
| 2020/0371892 A1* | 11/2020 | Huang | G06N 20/00 |

FOREIGN PATENT DOCUMENTS

| | | |
|---|---|---|
| JP | 2005-188501 A | 7/2005 |
| JP | 2007-161044 A | 6/2007 |
| JP | 2008-234044 | 10/2008 |
| JP | 2011-203116 | 10/2011 |
| JP | 2014-234113 A | 12/2014 |
| JP | 2017-218045 | 12/2017 |
| JP | 2019-117493 A | 7/2019 |
| WO | 2014/119196 A1 | 8/2014 |
| WO | 2018/003278 | 1/2018 |

OTHER PUBLICATIONS

International Search Report for PCT Application No. PCT/JP2020/021375, mailed on Aug. 4, 2020.

English translation of Written opinion for PCT Application No. PCT/JP2020/021375, mailed on Aug. 4, 2020.

* cited by examiner and ABNORMALITY DETECTION
ABNORMALITY DETECTION SYSTEM, ABNORMALITY DETECTION METHOD, AND ABNORMALITY DETECTION PROGRAM This application is a National Stage Entry of PCT/JP2020/021375 filed on May 29, 2020, which claims priority from Japanese Patent Application 2019-140491 filed on Jul. 31, 2019, the contents of all of which are incorporated herein by reference, in their entirety.

TECHNICAL FIELD

The present invention relates to an abnormality detection system, a control device, an abnormality detection method, a control method, and a control program for detecting an abnormality occurring in mobility while cooperating with the external.

BACKGROUND ART

A vehicle network abnormality detection technology is known, which determines an abnormality from data flowing inside mobility represented by a vehicle. Note that mobility is defined to mean transportation means (for example, a vehicle such as a car) in this specification. It is also known how to determine an abnormality of a vehicle externally by uploading the data of the vehicle network externally, rather than within the vehicle. However, if the vehicle data is always transmitted to the outside regardless of whether there is an abnormality or not, the amount of communication will become huge. Therefore, a method to reduce the amount of data to be transmitted has been proposed.

Patent literature 1 describes a fault diagnosis system that takes countermeasures against vehicle faults by communicating between a vehicle and an external organization. In the fault diagnosis system described in patent literature 1, the fault diagnosis process for faults or defects categorized into Level 1 is completed on the vehicle, and various vehicle data closely related to faults or defects categorized into Level 2 or Level 3 is transmitted from the vehicle to the information center for diagnosis.

CITATION LIST

Patent Literature

PTL 1: Japanese Patent Laid-Open No. 2005-188501

SUMMARY OF INVENTION

Technical Problem

Since there is a limit to the amount of data that can be stored in the vehicle network, it is not realistic to store all the information used for diagnosis in the vehicle network. On the other hand, the method of inquiring the cause of a fault to an external every time a similar event occurs may increase the amount of communication. The fault diagnosis system described in patent literature 1 identifies the cause of a fault by communicating with an information center each time a fault or a defect of a predetermined level is detected. Therefore, even when the cause is clear, the system is unable to suppress unnecessary communications.

Therefore, it is an object of the present invention to provide an abnormality detection system, an abnormality detection method, and an abnormality detection program capable of appropriately detecting an abnormality occurring in mobility while reducing the amount of communication with an external device that cooperates to determine the abnormality.

Solution to Problem

An abnormality detection system according to the present invention includes a control device which is mounted on mobility to be controlled and controls the mobility, and an external server which obtains condition of the mobility from the control device, wherein the control device includes a condition detection unit which detects the condition of the mobility, a condition determination unit which determines the condition of the mobility based on the detected condition, and a condition transmission unit which transmits to the external server the detected condition of the mobility and position information indicating a position where the condition is detected, wherein the external server includes an abnormal condition determination unit which determines an abnormal condition of the mobility in consideration of the position information, based on the received condition of mobility and the received position information, and a determination result transmission unit which transmits a determination result to the control device, and wherein the condition determination unit in the control device determines the condition of the mobility, based on the received determination result and the detected condition.

A control device according to the present invention is a control device which is mounted on mobility to be controlled and controls the mobility, and includes a condition detection unit which detects condition of the mobility, a condition determination unit which determines the condition of the mobility based on the detected condition, and a condition transmission unit which transmits the detected condition of the mobility and position information indicating a position where the condition is detected to an external server that determines an abnormal condition of the mobility based on the condition of mobility and the position information, and returns a determination result, wherein the condition determination unit determines the condition of the mobility based on the determination result received from the external server and the detected condition.

By an abnormality detection method according to the present invention, condition of the mobility is detected by a control device which is mounted on mobility to be controlled and controls the mobility, the condition of the mobility is determined based on the detected condition, by the control device, the detected condition of the mobility and position information indicating a position where the condition is detected is transmitted to an external server, by the control device, an abnormal condition of the mobility in consideration of the position information is determined based on the received condition of mobility and the received position information, by an external server, a determination result is transmitted to the control device, by the external server, and the condition of mobility is determined based on the received determination result and the detected condition, by the control device.

A control method according to the present invention is a control method for controlling mobility includes detecting condition of the mobility, determining the condition of the mobility based on the detected condition, transmitting the detected condition of the mobility and position information indicating a position where the condition is detected to an external server that determines an abnormal condition of the mobility, based on the condition of mobility and the position information, and returns a determination result, and determining the condition of the mobility based on the determination result received from the external server and the detected condition.

A control program according to the present invention is a control program applied to a computer which is mounted on mobility to be controlled and controls the mobility, causes the computer to execute a condition determination process of determining condition of the mobility based on the condition of the mobility detected by a condition detection unit, and a condition transmission process of transmitting the detected condition of the mobility and position information indicating a position where the condition is detected to an external server that determines an abnormal condition of the mobility, based on the condition of mobility and the position information, and returns the determination result, wherein the control program causes the computer to determine the condition of the mobility based on the determination result received from the external server and the detected condition, in the condition determination process.

Advantageous Effects of Invention

According to the present invention, it is possible to appropriately detecting an abnormality occurring in mobility while reducing the amount of communication with an external device that cooperates to determine the abnormality.

DESCRIPTION OF EMBODIMENTS

Hereinafter, an example embodiment of the present invention is described with reference to the drawings.

Figure 1:
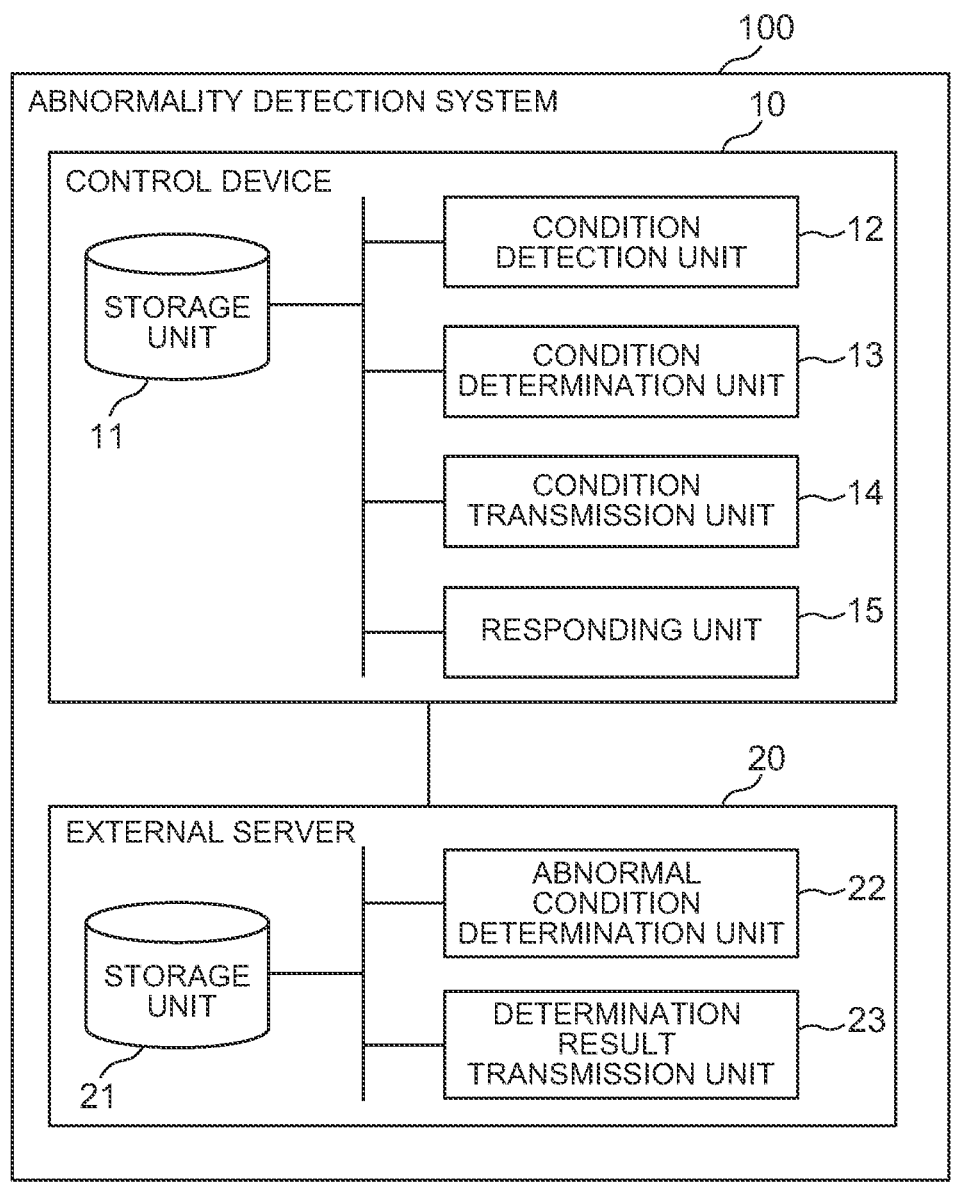
FIG. 1 It depicts a block diagram showing a configuration example of an example embodiment of an abnormality detection system according to the present invention.

FIG. 1 is a block diagram showing a configuration example of an example embodiment of an abnormality detection system according to the present invention. The abnormality detection system 100 of this example embodiment comprises a control device 10 and an external server 20.

The control device 10 is a device that is mounted on mobility to be controlled and controls the mobility. In the following description, a vehicle (for example, an automatic vehicle) is illustrated as an example of the mobility, but the mobility is not limited to a vehicle. The mobility may also be, for example, a train, an aircraft, or the like.

The external server 20 is communicatively connected to the control device 10 and obtains condition of the mobility from the control device 10 mounted on the mobility. The external server 20 may be a cloud-based device or an on-premise device.

The control device 10 includes a storage unit 11, a condition detection unit 12, a condition determination unit 13, a condition transmission unit 14, and a responding unit 15.

The storage unit 11 stores various information necessary for the control device 10 to operate. The storage unit 11 may also store information detected by the condition detection unit 12 described below, and may store various information obtained from the external server 20. Further, the storage unit 11 may store information used by the condition determination unit 13 described below to determine whether there is an abnormality or not. The storage unit 11 is realized by a magnetic disk or the like, for example.

The condition detection unit 12 detects various conditions of the mobility. Specifically, the condition detection unit 12 is realized by various electronic control units (ECU: Electronic Control Unit) in the mobility on which the control device 10 is mounted, and detects the condition of the target system. For example, in the case of a vehicle, dedicated electronic control units are mounted for the engine, the brake, the meters, the car navigation, the airbags, and the like. In addition, the condition detection unit 12 may also detect the direction of movement and acceleration of the mobility. Although only one condition detection unit 12 is illustrated in FIG. 1, the number of the condition detection unit 12 is not limited to one, and may be two or more. The control device 10 includes the condition detection unit 12 corresponding to the object for which the condition is detected.

The condition determination unit 13 determines the condition of the mobility based on the condition detected by the condition detection unit 12. Specifically, the condition determination unit 13 has an abnormality detection function to determine whether there is any abnormality of the mobility or not. The condition determination unit 13, for example, receives the in-vehicle network data transmitted by the electronic control units in the vehicle, and determines the abnormal condition of the mobility based on the frequency of occurrence and the content of the data.

The condition determination unit 13 may determine that there is an abnormality in the mobility when information indicating an abnormality is received from the condition detection unit 12 or when the received numerical value satisfies a condition for determining an abnormality (for example, the temperature or the number of rotations is over a threshold, the CPU load is over a threshold, etc.). The condition determination unit 13 may determine the condition (presence or absence of an abnormality) of the mobility based on the detected condition and the determination result received from the external server 20 described below.

In addition, the condition determination unit 13 detects not only the presence or absence of an abnormality, but also a condition in which an abnormality is suspected (a condition in which it is unknown whether there is an abnormality or not; hereinafter, referred to as an undeterminable condition). The condition determination unit 13 may determine an undeterminable condition when the measured values are in a gray zone range or when the combination of multiple conditions is unnatural, for example.

One example of a combination of unnatural conditions is a situation where the speed is increasing while the drive of an accelerator is not confirmed. For example, if this situation is detected on a flat road, it can be determined as a condition indicating abnormal acceleration. On the other hand, if this situation is detected on a downhill slope, it may be determined not to be abnormal, considering the degree of acceleration.

Another example of a combination of unnatural conditions is a situation where the vehicle is moving with the engine off. For example, if this situation is detected in an inclined area, the brake is not functioning and the condition can be determined to indicate a brake abnormality. On the other hand, if this situation is detected in a multi-storey car park, it can be determined that the vehicle is in the process of entering a garage and that it is not abnormal.

The condition transmission unit 14 transmits the detected the condition of the mobility and information indicating the position where the condition was detected (hereinafter, referred to as position information) to the external server 20. In other words, in this example embodiment, the condition transmission unit 14 requests the external server 20 to determine whether or not there is an abnormality of the mobility in case that the position information is taken into account. Further, the condition transmission unit 14 may transmit information indicating the time when the condition of the mobility was detected (hereinafter, referred to as time information) and information indicating the direction of movement to the external server 20.

At this time, it is preferable that the condition transmission unit 14 transmits the detected condition of the mobility and the position information to the external server 20 when the condition determination unit 13 cannot determine an abnormal condition from the condition of the mobility (when the condition is determined to be an undeterminable condition). By restricting the transmission of these information to the undeterminable condition, it is possible to reduce the amount of communication with the external device (external server 20) by the control device 10.

The responding unit 15 performs a response depending on the condition of the mobility. Specifically, when the condition of the mobility is determined to be abnormal, the responding unit 15 performs a response depending on the type of abnormality. For example, the responding unit 15 may obtain log information at the time when the abnormality is determined and store it in the storage unit 11, and may display a warning to an output device (not shown) or output audio.

Since the response to be performed by the responding unit 15 depends on the policy set for each mobility, the process according to the determination result may be set individually. For example, when responding from a fail-safe perspective, the responding unit 15 may strongly warn the driver of an emergency stop, or shut down the network, etc.

The condition determination unit 13, the condition transmission unit 14, and the responding unit 15 are realized by a processor (for example, a CPU (Central Processing Unit), a GPU (Graphics Processing Unit)) of a computer that operates according to a program (control program).

For example, a program may be stored in the storage unit 11, and the processor may read the program and operate as the condition determination unit 13, the condition transmission unit 14, and the responding unit 15 according to the program. In addition, the function of the control device 10 may be provided in a SaaS (Software as a Service) format.

The external server 20 includes a storage unit 21, an abnormal condition determination unit 22, and a determination result transmission unit 23.

The storage unit 21 stores various information necessary for the external server 20 to operate. In addition, the storage unit 21 may store map information used for determination by the abnormal condition determination unit 22 described below. Further, the storage unit 21 may store the position information and the condition determination results for the mobility condition in association, which are used by the abnormal condition determination unit 22 described below to determine the abnormal condition. In a case where the abnormal condition determination unit 22 can obtain map information from another device (not shown), the storage unit 21 may not store the map information. The storage unit 21 is realized by a magnetic disk or the like, for example.

Based on the condition of the mobility and the position information received from the control device 10, the abnormal condition determination unit 22 determines an abnormal condition of the mobility in consideration of the position information. In other words, the abnormal condition determination unit 22 determines the abnormal condition of the mobility according to the position information. Note that this does not prevent the abnormal condition determination unit 22 from determining the abnormal condition without using the position information if the abnormal condition can be determined by the condition of the mobility alone.

Specifically, the abnormal condition determination unit 22 may determine an abnormal condition of the mobility, referring to the position information stored in the storage unit 21 and the condition determination result corresponding to the condition of the mobility. In addition, the abnormal condition determination unit 22 may obtain information on the surrounding environment from the received position information based on the map information, and may determine the abnormal condition depending on the situation of the surrounding environment and the condition of the mobility. The condition determination results corresponding to the situation of the surrounding environment and the condition of the mobility may also be stored in the storage unit 21 in advance.

The abnormal condition determination unit 22 may determine an abnormal condition of the mobility in consideration of the time information based on the condition of the mobility received from the control device 10 and the time information.

The determination result transmission unit 23 transmits the determination result to the control device 10. Specifically, the determination result transmission unit 23 transmits the determination result of the abnormal condition for the condition of the mobility and the position information to the control device 10. The control device 10 registers the received determination result in the storage unit 11. The condition determination unit 13 uses the registered results of the determination for a condition determination process. For example, if information on a range of the condition of the mobility and position information where can be determined to match is stored in the storage unit 11 as a determination result, the condition determination unit 13 may determine the determination result of the corresponding abnormal condition as the condition of the mobility.

The abnormal condition determination unit 22 may identify, from the received condition of the mobility and the position information, a range of position information where a similar determination is made. Then, the determination result transmission unit 23 may transmit the determination result including the range of position information where the similar determination is made to the control device 10. As the range of position information where a similar determination is made, position information including a similar landscape (for example, an uphill slope, a downhill slope, etc.), position information including a similar facility (for example, a multi-storey car park, etc.), and position information including a similar communication situation (for example, a communication area of a mobile phone, etc.).

For example, suppose that the external server 20 receives from the control device 10 a situation where the speed is increasing while the drive of the accelerator has not been confirmed. If this is a condition detected on a downhill slope and is determined to be not abnormal, the abnormal condition determination unit 22 may transmit to the control device 10, in addition to the transmitted position information, position information indicating a range in which the downhill slope continues. For example, suppose that a situation where the vehicle is moving with the engine turned off is received from the control device 10. If this is detected in a multi-storey car park and determined not to be abnormal, the abnormal condition determination unit 22 may transmit to the control device 10, in addition to the transmitted position information, position information of a range in which the multi-storey car park is included.

In this way, when the control device 10 detects a similar "situation where the speed is increasing while the accelerator drive is not confirmed," the condition determination unit 13 can determine that there is no abnormality without inquiring the external server 20.

Furthermore, the control device 10 receiving such information can make an abnormality determination other than "relation between the accelerator and the speed" within a range of a downhill slope. For example, a situation where the deceleration is weak even though the brake is depressed may be detected on the same downhill slope. For this phenomenon also, if the external environment is unknown, it is necessary to inquire the external server 20 for the determination of the abnormal condition. On the other hand, the condition determination unit 13 that obtains information that it is a downhill slope can also determine the abnormal condition in consideration of the fact that it is a downhill slope.

Further, the determination result transmission unit 23 transmits the determination result to mobility (more specifically, the control device 10 mounted on the mobility) that exists in the range indicated by the transmitted position information or the position information where a similar determination is made, in addition to the mobility (the control device 10) to which the condition of the mobility and position information are transmitted. Thus, since the results of the determination can be transmitted only to the control device 10 that are assumed to make similar determinations, the results of the determination can be transmitted to appropriate targets while suppressing the amount of communication as compared with the case where the results of the determination are transmitted to all the control device 10.

For example, suppose that, for a certain vehicle, a "situation where the speed is increasing while the drive of the accelerator is not confirmed" is detected on a downhill slope. In this case, the determination result transmission unit 23 may transmit information on how far the same downhill slope is to the leading vehicle that detected the phenomenon and to subsequent vehicles that may detect the similar phenomenon while driving in the vicinity. For example, a connected car may suppose that there is an assumption that the external server 20 generally knows where and how the vehicle is generally driving from the position information. Here, if the vehicle for which the abnormal condition was first detected was detected on a long downhill road on an expressway, the determination result transmission unit 23 feeds back the information to a group of similar vehicles that are about to approach the same long downhill road on the expressway. This not only allows the vehicle in which the situation was first detected to complete a second and subsequent similar abnormality detection with the control device 10 in the vehicle, but also allows subsequent vehicles to complete a similar phenomenon with the control device 10 in the vehicle. Therefore, it is possible to suppress bursty inquiries to the external server 20.

The abnormal condition determination unit 22 may determine an abnormal condition of the mobility based on time information in addition to the condition and position information of the mobility. This makes it possible to more appropriately determine an abnormal condition for a situation where the condition determination unit 13 determines an undeterminable condition and transmits.

For example, assume a situation where a vehicle attempts to stop on a road with its hazard lamps turned on. Suppose that the place where the vehicle is to be stopped has a designated time when parking and stopping are prohibited. For example, if the time at which the situation is detected is outside the parking and stopping prohibition time, the abnormal condition determination unit 22 may determine that the situation is not abnormal. In this case, the determination result transmission unit 23 may transmit information on the parking and stopping prohibition time of the position to the control device 10. By behaving that way, the control device 10 can determine that there is no problem if the vehicle continues to be parked or stopped at the same position outside the parking and stopping prohibition time without having to inquire the external server 20 again. On the contrary, if it is within the parking and stopping prohibition time, the control device 10 may detect an abnormal condition (that it is a violation).

The determination result transmission unit 23 may transmit not only the determination result of the abnormal condition but also supplementary information corresponding to the determination result to the control device 10. For example, suppose that a situation indicating that the remaining fuel is getting low is transmitted from the control device 10. In this case, the determination result transmission unit 23 may transmit to the control device 10 information of a refueling point that can be reached within the remaining fuel, depending on the determination result of the abnormal condition or regardless of the determination result. Further, if the time information is known, the determination result transmission unit 23 may transmit to the control device 10 information of the refueling point that arrival time is within the business hours.

The abnormal condition determination unit 22 may determine an abnormal condition of the mobility based on time information instead of position information. For example, when a rental car or a car sharing is used, the period when the vehicle can be used is limited. Therefore, the abnormal condition determination unit 22 may determine the abnormal condition based on the rental information on the external server that changes from moment to moment, for example. For example, if there is no reservation at a subsequent time, the abnormal condition determination unit 22 may decide to prompt the user to register an extension of use. On the other hand, if there is a reservation for a subsequent time, since the return of the vehicle is mandatory, the abnormal condition determination unit 22 may consider possibility of an abnormal condition and determine that a warning is necessary.

The abnormality condition determination unit 22 and the determination result transmission unit 23 are realized by a processor of a computer operating according to a program (abnormality determination program).

Figure 2:
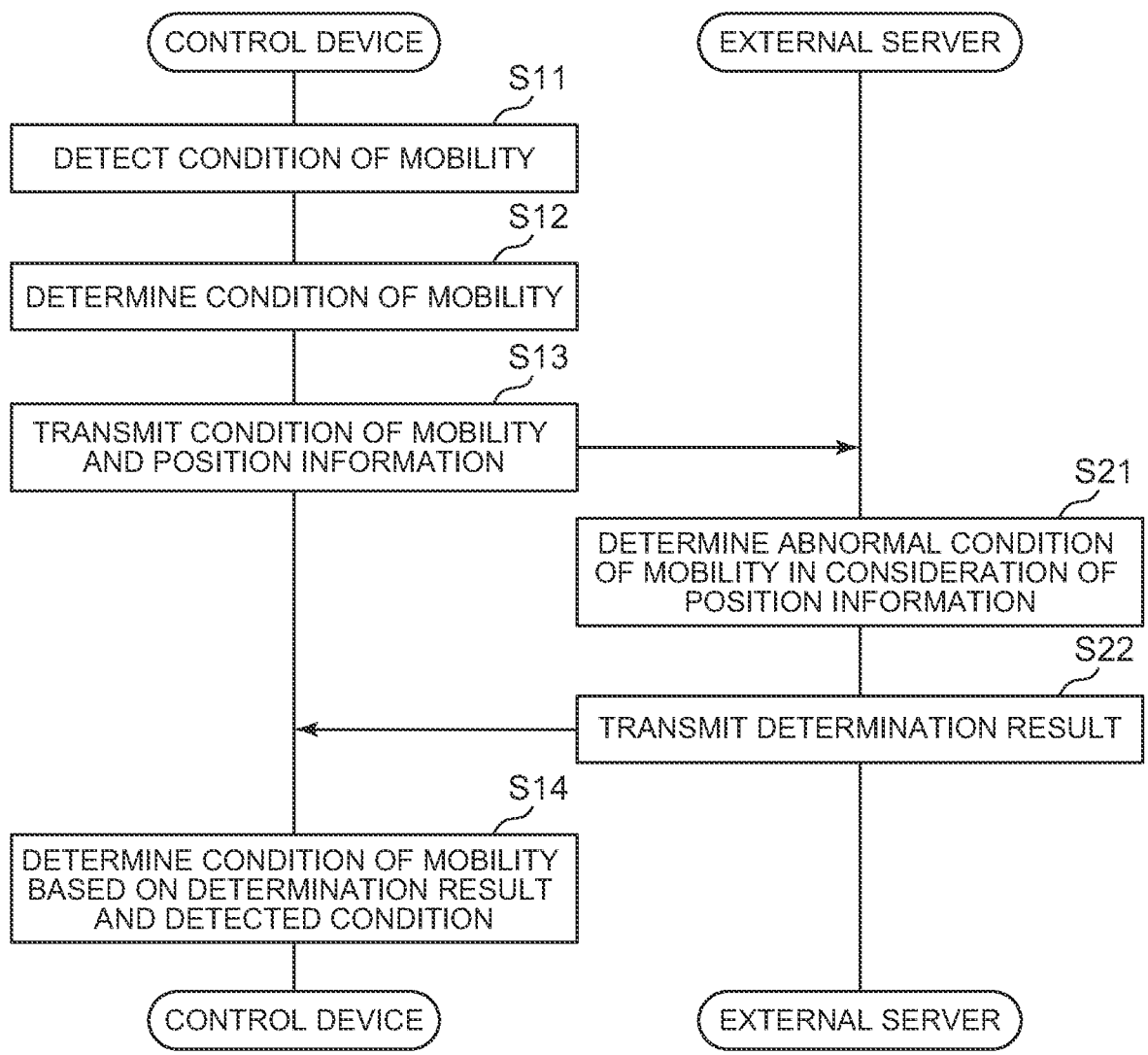
FIG. 2 It depicts a flowchart showing an operation example of an abnormality detection system.

Next, an operation example of this example embodiment will be described. FIG. 2 is a flowchart showing an operation example of an abnormality detection system. The condition detection unit 12 in the control device 10 detects a condition of the mobility (step S11). The condition determination unit 13 determines the condition of the mobility based on the detected condition (step S12). Then, the condition transmission unit 14 transmits the detected condition of the mobility and the position information at which the condition was detected to the external server 20 (step S13). The condition transmission unit 14 may transmit the information to the external server 20 when the condition is determined to be an undeterminable condition.

The abnormal condition determination unit 22 in the external server 20 determines, based on the received condition of the mobility and position information, an abnormal condition of the mobility in consideration of the position information (step S21). The abnormal condition determination unit 22 transmits the determination result to the control device 10 (step S22).

Thereafter, the process from step S11 is repeated, and the condition determination unit 13 in the control device 10 determines the condition of the mobility based on the determination result received from the external server 20 and the detected condition (step S14).

Figure 3:
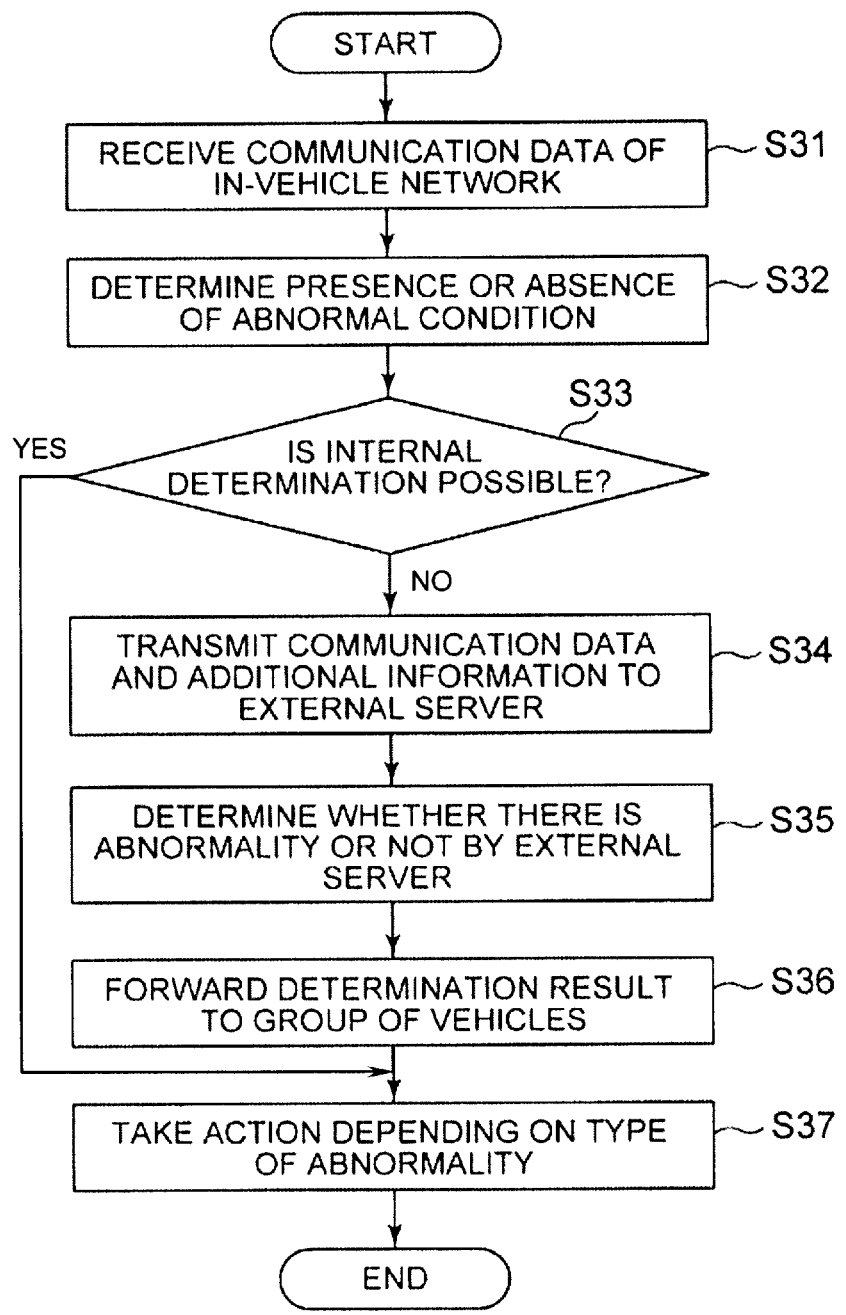
FIG. 3 It depicts a flowchart showing a specific operation example of an abnormality detection system.

FIG. 3 is a flowchart showing a specific operation example of an abnormality detection system of this example embodiment. The condition detection unit 12 receives communication data of the in-vehicle network (step S31). The condition determination unit 13 analyzes the received communication data (for example, analyzes a frequency of occurrence, contents of the data, etc.) to determine presence or absence of the abnormal condition (step S32). If the presence or absence of the abnormal condition can be determined within the control device 10 (Yes in step S33), the subsequent processing in step S37 is performed.

On the other hand, if the presence or absence of the abnormal condition cannot be determined within the control device 10 (No in step S33), the condition transmission unit 14 transmits the received communication data and additional information about the vehicle (position information, condition of the vehicle, data of the nearby in-vehicle network, etc.) to the external server 20 (step S34).

The abnormal condition determination unit 22 in the external server 20 compares the communication data and additional information of the in-vehicle network obtained from the vehicles with more information which held by itself to determine whether there is an abnormality or not (step S35). The abnormal condition determination unit 22 also forwards the determination result (reasons for the determination, external environment, information that the vehicle does not have, etc.) to a group of vehicles, if necessary (step S36). From this, the control device 10 (more specifically, the condition determination unit 13) modifies a determination standard and a determination logic by taking the information into account, and uses them for the determination of the subsequent abnormal condition. When an abnormal condition is determined, the responding unit 15 takes action (logging, issuing a warning, etc.) depending on the type of abnormality (step S37).

As described above, in this example embodiment, the condition detection unit 12 in the control device 10 detects a condition of the mobility, the condition determination unit 13 determines the condition of the mobility based on the detected condition, and the condition transmission unit 14 transmits the detected condition of the mobility and position information indicating the position at which the condition was detected to the external server 20. Then, the abnormality condition determination unit 22 in the external server 20 determines, based on the received condition of the mobility and the position information, an abnormality condition of the mobility in consideration of the position information, and the determination result transmission unit 23 transmits the determination result to the control device 10. The condition determination unit 13 in the control device 10 determines the condition of the mobility based on the received determination result and the detected condition. Accordingly, it is possible to appropriately detecting an abnormality occurring in mobility while reducing the amount of communication with an external device that cooperates to determine the abnormality.

In this example embodiment, a method in which the condition transmission unit 14 transmits various information to the external server 20 has been described. However, the control device 10 (more specifically, the condition determination unit 13) may determine events that may occur to its own mobility in the future. In this way, the impact of vague information that may pose a hazard in general on a particular vehicle can be comprehensively determined by combining the information obtained by both.

For example, the condition determination unit 13 may determine the impact of emergency bulletins (such as "emergency earthquake bulletins", "tsunami warnings", "special warnings" and "disaster and evacuation information") on individual vehicles. As an example, if a vehicle is about to proceed to an area where a large-scale eruption has occurred and there is a risk of landslides, the responding unit 15 may urgently inform the driver thereof.

There are other events, for example, that may be fateful in some cases, even if the information is generally considered to be not so urgent. As an example, suppose that a driver is driving on an expressway with the "hood" of a convertible open, and suddenly discovers an area on the road where sudden heavy rainfall is occurring. At this time, the condition determination unit 13 may determine that the driving may be affected, and the responding unit 15 may urge the driver to cover the "hood" as soon as possible.

Figure 4:
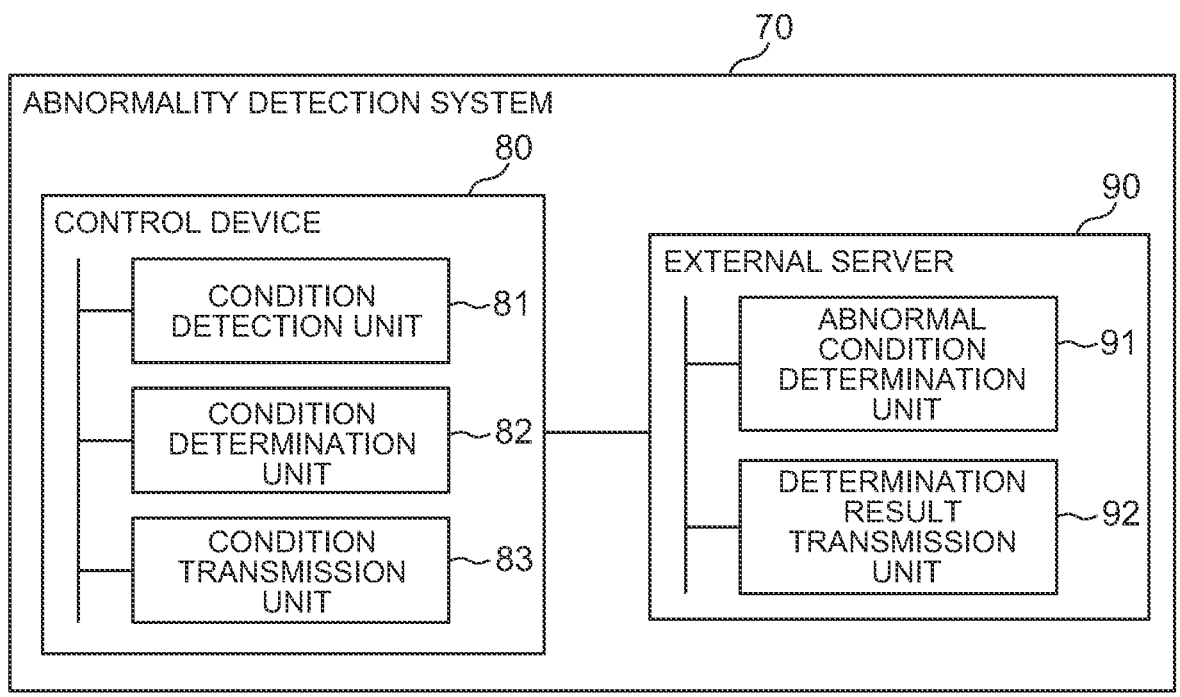
FIG. 4 It depicts a block diagram showing an overview of an abnormality detection system according to the present invention.

Next, an overview of the present invention will be described. FIG. 4 is a block diagram showing an overview of an abnormality detection system according to the present invention. An abnormality detection system 70 (for example, the abnormality detection system 100) according to the present invention comprises a control device 80 (for example, the control device 10) which is mounted on mobility (for example, a vehicle) to be controlled and controls the mobility, and an external server 90 (for example, the external server 20) which obtains condition of the mobility from the control device 80.

The control unit 80 includes a condition detection unit 81 (for example, the condition detection unit 12) which detects the condition of the mobility, a condition determination unit 82 (for example, the condition determination unit 13) which determines the condition of the mobility based on the detected condition, and a condition transmission unit 83 (for example, the condition transmission unit 14) which transmits to the external server the detected condition of the mobility and position information indicating a position where the condition is detected.

The external server 90 includes an abnormal condition determination unit 91 (for example, the abnormal condition determination unit 22) which determines an abnormal condition of the mobility in consideration of the position information, based on the received condition of mobility and the received position information, and a determination result transmission unit 92 (for example, the determination result transmission unit 23) which transmits a determination result to the control device.

Then, the condition determination unit 82 in the control unit 80 determines the condition of the mobility, based on the received determination result and the detected condition.

With such a configuration, it is possible to appropriately detecting an abnormality occurring in mobility while reducing the amount of communication with an external device that cooperates to determine the abnormality.

In addition, the abnormal condition determination unit 91 may identify a range of the position information where a similar determination is made from the received condition of mobility, and the determination result transmission unit 92 may transmit to the control device the determination result including the range of the position information where the similar determination is made. With such a configuration, it is possible to determine the abnormality of mobility within the range where the similar determination is made and to suppress the amount of communication.

In addition, the determination result transmission unit 92 may transmit the determination result to other mobility that exists in the range of the transmitted position information or the position information where the similar determination is made, in addition to the mobility from which the condition is transmitted. With such a configuration, it is possible to determine an abnormality by other mobility inside mobility and to suppress the amount of communication.

In addition, the abnormal condition determination unit 91 may determine the abnormal condition of the mobility, based on the condition of the mobility, the position information, and time information indicating a time when the condition of the mobility is detected. With such a configuration, it is possible to make a more appropriate abnormality determination.

In addition, the condition transmission unit 83 may transmit the condition of the mobility to the external server when the abnormal condition cannot be determined from the condition of the mobility.

Figure 5:
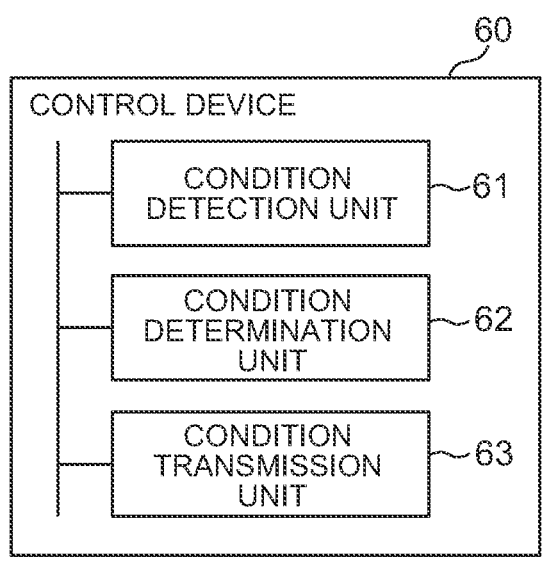
FIG. 5 It depicts a block diagram showing an overview of a control device according to the present invention.

FIG. 5 is a block diagram showing an overview of a control device according to the present invention. A control device 60 according to the present invention is a control device (for example, the control device 10) which is mounted on mobility to be controlled and controls the mobility, and includes a condition detection unit 61 (for example, the condition detection unit 12) which detects condition of the mobility, a condition determination unit 62 (for example, the condition determination unit 13) which determines the condition of the mobility based on the detected condition, and a condition transmission unit 63 (for example, the condition transmission unit 64) which transmits the detected condition of the mobility and position information indicating a position where the condition is detected to an external server that determines an abnormal condition of the mobility based on the condition of mobility and the position information, and returns a determination result.

Then, the condition determination unit 62 determines the condition of the mobility based on the determination result received from the external server and the detected condition.

Even with such a configuration, it is possible to appropriately detecting an abnormality occurring in mobility while reducing the amount of communication with an external device that cooperates to determine the abnormality.

Although the invention of the present application has been described above with reference to the example embodiment and the example, the present invention is not limited to the above example embodiment and the example. Various changes can be made to the configuration and details of the present invention that can be understood by those skilled in the art within the scope of the present invention.

This application claims priority based on Japanese Patent Application No. 2019-140491 filed on Jul. 31, 2019, the disclosure of which is incorporated herein in its entirety.

REFERENCE SIGNS LIST

10 Control device
11 Storage unit
12 Condition detection unit
13 Condition determination unit
14 Condition transmission unit
15 Responding unit
20 External server
21 Storage unit
22 Abnormal condition determination unit
23 Determination result transmission unit
100 Abnormality detection system

The invention claimed is:

1. A system comprising:
a first control device mounted on a first mobility to be controlled and that controls the first mobility, the first mobility to encounter a condition at a first time;
a second control device mounted on a second mobility to be controlled and that controls the second mobility, the second mobility to encounter the condition at a second time after the first time; and
an external server that obtains the condition of the first mobility from the first control device,
wherein the first control device includes:
a first memory storing first instructions; and
a first processor configured to execute the first instructions to:
detect the condition of the first mobility at the first time;
perform a first determination to determine an abnormality of the first mobility based on the detected condition; and
in a case that the abnormality of the first mobility cannot be determined in the first determination, transmit to the external server the detected condition of the first mobility and position information indicating a position where the condition has been detected,
wherein the external server includes:
a second memory configured to store second instructions; and
a second processor configured to execute the second instructions to:
receive the condition of the first mobility and the position information from the first control device;
perform a second determination to determine the abnormality of the first mobility, based on the condition of the first mobility and the position information where the condition has been detected; and
transmit a result of the second determination to the first control device and to the second control device,
wherein the first processor in the control device is configured to execute the first instructions to further issue a warning to a first output device, based on the abnormality indicated in a result of the second determination,
wherein the second control device includes:
a third memory storing third instructions; and
a third processor configured to execute the third instructions to:
receive the result of the second determination from the external server, before the second time;
detect the condition of the second mobility at the second time;
perform a third determination to determine the abnormality of the second mobility based on the detected condition and based on the result of the second determination; and
issue a warning to a second output device based on the abnormality indicated in a result of the third determination,
wherein transmission of the result of the second determination from the external server to the second control device permits the second control device to detect the abnormality of the second mobility and suppresses transmission of the detected condition of the second mobility and position information of the second mobility from the second control device to the external server to detect the abnormality of the second mobility.

2. The system according to claim 1, wherein the second processor in the external server is configured to execute the second instructions to:
   identify a range where a landscape or a communication situation is similar to the received position information; and
   transmit to the first control device the result of the second determination including the identified range.

3. The system according to claim 2, wherein the second processor in the external server is configured to execute the second instructions to:
   transmit to the second control device the result of the second determination including the identified range.

4. The system according to claim 1, wherein the second processor in the external server is configured to execute the second instructions to:
   the abnormality of the first mobility, based on the condition of the first mobility, the position information, and time information indicating a time when the condition of the first mobility was detected.

5. The system according to claim 1, wherein the first processor in the first control device is configured to execute the first instructions to:
   perform a fourth determination to determine the abnormality of the first mobility, based on the result of the second determination and the detected condition of the first mobility.

6. A control method for controlling a first mobility and a second mobility comprising:
   by a first control device mounted on a first mobility to be controlled and that controls the first mobility, where the first mobility encounters a condition at a first time:
      detecting the condition of the first mobility at the first time;
      performing a first determination to determine an abnormality of the first mobility based on the detected condition; and
      in a case that the abnormality of the first mobility cannot be determined in the first determination, transmitting to an external server the detected condition of the first mobility and position information indicating a position where the condition has been detected;
   by an external server:
      receiving the condition of the first mobility and the position information from the first control device;
      performing a second determination to determine the abnormality of the first mobility, based on the condition of the first mobility and the position information where the condition has been detected; and
      transmitting a result of the second determination to the first control device and to a second control device mounted on a second mobility to be controlled and that controls a second mobility;
   by the second control device, where the second mobility encounters the condition at a second time after the first time:
      receiving the result of the second determination from the external server, before the second time;
      detecting the condition of the second mobility at the second time;
      performing a third determination to determine the abnormality of the second mobility based on the detected condition and based on the result of the second determination; and
      issuing a warning to a second output device based on the abnormality indicated in a result of the third determination,
   wherein transmission of the result of the second determination from the external server to the second control device permits the second control device to detect the abnormality of the second mobility and suppresses transmission of the detected condition of the second mobility and position information of the second mobility from the second control device to the external server to detect the abnormality of the second mobility,
   by the first control device:
      determining that the abnormality does not affect the first mobility at a current time, that the abnormality will not affect the first mobility at a future time in a first state of the first mobility, and that the abnormality will affect the first mobility at a future time in a second state of the first mobility;
      determining a current state of the first mobility; and
      in a case in which the current state of the first mobility is the second state, issuing a warning to a first output device to indicate that the first mobility should be transitioned to the first state.

\* \* \* \* \*